(12) United States Patent
Schwalm et al.

(10) Patent No.: US 8,626,424 B2
(45) Date of Patent: Jan. 7, 2014

(54) ACTIVE COAST AND CRUISE CONTROL SYSTEM AND METHODS

(75) Inventors: Jayson S. Schwalm, Farmington Hills, MI (US); Steven Thomas Ford, Brighton, MI (US); John J. Koenig, Howell, MI (US)

(73) Assignee: GM Global Technology Operations LLC

( * ) Notice: Subject to any disclaimer, the term of this patent is extended or adjusted under 35 U.S.C. 154(b) by 917 days.

(21) Appl. No.: 12/536,010

(22) Filed: Aug. 5, 2009

(65) Prior Publication Data

US 2011/0035135 A1    Feb. 10, 2011

(51) Int. Cl.
G06F 19/00 (2011.01)
B60K 31/00 (2006.01)

(52) U.S. Cl.
USPC ............................. 701/110; 701/94; 180/170

(58) Field of Classification Search
USPC ....................... 701/110, 93, 94; 180/170, 179
See application file for complete search history.

(56) References Cited

U.S. PATENT DOCUMENTS

| 4,825,368 A * | 4/1989 | Itoh et al. ........................ 701/69 |
| 4,961,475 A * | 10/1990 | Kurihara et al. ............... 180/179 |
| 6,078,860 A * | 6/2000 | Kerns ............................... 701/93 |
| 7,223,204 B2 * | 5/2007 | Steen et al. ..................... 477/97 |
| 8,187,149 B2 * | 5/2012 | Koenig ........................... 477/98 |
| 2010/0152990 A1 * | 6/2010 | Bjernetun et al. ............. 701/93 |

FOREIGN PATENT DOCUMENTS

CN           1930412        3/2007
WO    WO2008/130288    10/2008

* cited by examiner

*Primary Examiner* — Mahmoud Gimie
*Assistant Examiner* — David Hamaoui

(57) ABSTRACT

An engine control system of the present disclosure comprises a target speed module and a coupling module. The target speed module determines a target speed of a vehicle based on a speed of the vehicle and at least one of an accelerator input and a speed control input. The coupling module controls coupling of an engine system and a drive system of the vehicle based on the speed and the target speed. The engine system transfers torque to the drive system when coupled and does not transfer torque to the drive system when decoupled. In other features, the engine control system further comprises a torque control module that controls torque output by the engine system based on the coupling of the engine system and the drive system, the speed, and the target speed.

20 Claims, 3 Drawing Sheets

ACTIVE COAST AND CRUISE CONTROL SYSTEM AND METHODS

FIELD

The present disclosure relates to engine control systems, and more particularly to an active coast and cruise control system and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Various engine systems may be used to accelerate a vehicle and maintain a vehicle speed. Each engine system may use energy to produce drive torque. Internal combustion engines may use chemical energy from fuels such as gasoline, diesel, or hydrogen. Electric motors may use electricity energy from a battery source or a power source that may include fuel cells. A hybrid system may use a combination of an internal combustion engine and an electric motor.

The engine system may transfer the drive torque to a drive system when the engine system couples with the drive system. The drive system may include a transmission and/or a drive wheel. With each engine system and drive system, vehicle energy may be lost through friction losses, varying driving conditions such as elevation changes, and driving behavior.

SUMMARY

An engine control system of the present disclosure comprises a target speed module and a coupling module. The target speed module determines a target speed of a vehicle based on a speed of the vehicle and at least one of an accelerator input and a speed control input. The coupling module controls coupling of an engine system and a drive system of the vehicle based on the speed and the target speed. The engine system transfers torque to the drive system when coupled and does not transfer torque to the drive system when decoupled. In other features, the engine control system further comprises a torque control module that controls torque output by the engine system based on the coupling of the engine system and the drive system, the speed, and the target speed.

In yet other features, the coupling module decouples the engine system from the drive system and the torque control module reduces the torque output by the engine system to a predetermined torque output when the speed differs by less than a predetermined speed from the target speed. In still other features, the coupling module couples the engine system with the drive system and the torque control module reduces the torque output by the engine system when the speed is greater than the target speed by a predetermined speed.

In yet other features, the coupling module couples the engine system with the drive system and the torque control module increases the torque output by the engine system when the speed is less than the target speed by a predetermined speed. In still other features, the coupling module decouples the engine system from the drive system and the torque control module reduces the torque output by the engine system to a predetermined torque output when the accelerator input is less than a predetermined threshold.

In yet other features, the torque control module controls the torque output of at least one of an internal combustion engine and an electric motor. In still other features, the coupling module controls coupling of the engine system and the drive system by controlling at least one of engagement of a clutch and selection of a neutral gear of an automatic transmission.

In yet other features, the target speed module determines the target speed when the accelerator input is greater than a predetermined threshold and varies by less than a predetermined amount during a predetermined period. In still other features, the target speed module determines the target speed when the speed control input is turned on.

A method of the present disclosure comprises: determining a target speed of a vehicle based on a speed of the vehicle and at least one of an accelerator input and a speed control input; and controlling coupling of an engine system and a drive system of the vehicle based on the speed and the target speed, wherein the engine system transfers torque to the drive system when coupled and does not transfer torque to the drive system when decoupled. In other features, the method further comprises controlling torque output by the engine system based on the coupling of the engine system and the drive system, the speed, and the target speed.

In yet other features, the method further comprises: decoupling the engine system from the drive system when the speed differs by less than a predetermined speed from the target speed; and reducing the torque output by the engine system to a predetermined torque output. In still other features, the method further comprises: coupling the engine system with the drive system when the speed is greater than the target speed by a predetermined speed; and reducing the torque output by the engine system.

In yet other features, the method further comprises coupling the engine system with the drive system when the speed is less than the target speed by a predetermined speed; and increasing the torque output by the engine system. In still other features, the method further comprises decoupling the engine system from the drive system when the accelerator input is less than a predetermined threshold; and reducing the torque output by the engine system to a predetermined torque output.

In yet other features, the method further comprises controlling the torque output of at least one of an internal combustion engine and an electric motor. In still other features, the method further comprises controlling coupling of the engine system and the drive system by controlling at least one of engagement of a clutch and selection of a neutral gear of an automatic transmission.

In yet other features, the method further comprises determining the target speed when the accelerator input is greater than a predetermined threshold and varies by less than a predetermined amount during a predetermined period. In still other features, the method further comprises determining the target speed when the speed control input is turned on.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
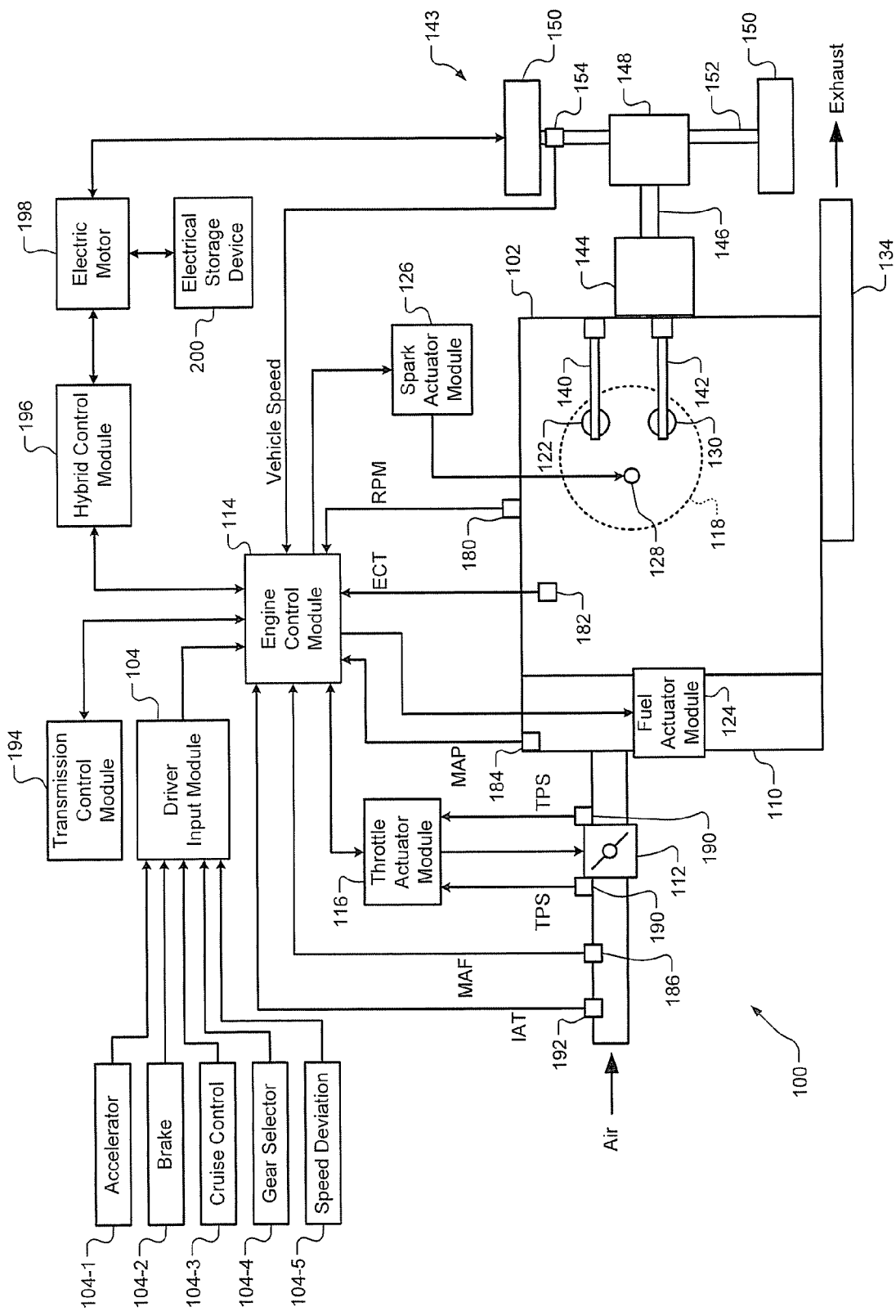
FIG. 1 is a functional block diagram of an exemplary engine system and an exemplary drive system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Vehicle energy may be conserved by increasing the time spent at low engine speeds and low drive torque, increasing the time spent coasting at a vehicle speed, such as in a neutral gear or with a disengaged clutch, and/or maintaining vehicle speed within a vehicle speed range. Road conditions such as inclines and descents may assist in maintaining vehicle speed within the speed range.

For example only, vehicle energy may be conserved by disengaging the drive system and allowing the vehicle to coast without drive torque from the engine system, reducing friction losses when the engine system is not producing drive torque, controlling vehicle speed to a target vehicle speed range and using road conditions to assist in maintaining the vehicle speed, and/or converting kinetic energy of the vehicle to electrical energy during vehicle braking.

The active coast and cruise control system and method of the present disclosure may selectively couple the engine system with the drive system of the vehicle and adjust drive torque of the engine system to conserve energy. The engine system may be selectively coupled with the drive system based on a driver input and a sensed vehicle speed. The driver input may include an accelerator input, a brake input, a gear selector input, and a cruise control input. Drive torque produced by the engine system may be adjusted based on the coupling of the engine system with the drive system and the vehicle speed.

Referring now to FIG. 1, engine system 100 includes an engine 102 that combusts an air/fuel mixture to produce drive torque for a vehicle based on input from a driver input module 104. A driver may position an accelerator input device 104-1 and/or a brake input device 104-2 to control vehicle speed. The driver may position a cruise control input device 104-3 to an on or off position to control vehicle speed. The driver may position a gear selector input device 104-4 to a gear position such as a drive gear. The driver may position a speed deviation input device 104-5 to a speed deviation level to control a vehicle speed range.

The driver input module 104 may generate a driver input signal based on signals from the input devices. For example only, an accelerator position signal may be based on the position of the accelerator input device 104-1. A brake position signal may be based on the position of the brake input device 104-2. A cruise control signal may be based on the position of the cruise control input device 104-3. A gear signal may be based on the selected gear from the gear selector input device 104-4. A speed deviation signal may be based on the speed deviation level from the speed deviation input device 104-5.

Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders.

Air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve of each of the cylinders. In various implementations not depicted in FIG. 1, fuel may be injected directly into the cylinders or into mixing chambers associated with the cylinders.

The injected fuel mixes with air and creates an air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC).

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The spark actuator module 126 may be controlled by a timing signal indicating how far before or after TDC the spark should be provided. Operation of the spark actuator module 126 may therefore be synchronized with crankshaft rotation.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders.

The vehicle may further include a drive system 143. The drive system 143 may include an automatic transmission 144, a driveshaft 146, a differential 148, and/or a final drive 150. When the drive system 143 is coupled with the engine system 100, drive torque may be transferred to the final drive 150 to propel the vehicle. For example, the automatic transmission 144 may transfer drive torque from the engine system 100 to the final drive 150 through the driveshaft 146 and the differential 148. The final drive 150 may include a drive wheel. The differential 148 may transfer the torque to multiple drive wheels through an axle 152. A speed of the vehicle may be measured at the final drive 150 by a speed sensor 154.

The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100. The ECM 114 may generate an engine load signal based on the MAF signal, the throttle position signal, the IAT signal, and/or the MAP signal.

The ECM 114 may communicate with a transmission control module 194 to coordinate shifting gears in the automatic transmission 144. For example only, the ECM 114 may reduce engine torque during a gearshift. The ECM 114 may coordinate selection of gears in the automatic transmission 144 based on the gear selector input device 104-4. The ECM 114 may coordinate coupling of the automatic transmission 144 with the engine 102 such as through a clutch (not shown). The ECM 114 may coordinate coupling of the automatic transmission 144 with the engine 102 such as through a torque converter (not shown). When the engine 102 couples with the automatic transmission 144, drive torque may be transferred to the final drive 150. The ECM 114 may communicate with a hybrid control module 196 to coordinate operation of the engine 102, the drive system 143, and an electric motor 198.

The electric motor 198 may also produce drive torque for the vehicle. The electric motor 198 may couple with the drive system 143 to transfer drive torque to the final drive 150. For example only, the electric motor 198 may couple with the automatic transmission 144 to transfer drive torque to the final drive 150. The electric motor 198 may couple directly with the final drive 150 to transfer drive torque to the final drive 150. The electric motor 198 may couple with the engine 102 through a belt and pulley system (not shown).

The electric motor 198 may also function as a generator to produce electrical energy for use by vehicle electrical systems and/or for storage in an electrical storage device 200, such as a battery. For example only, the electric motor 198 may generate electrical energy when coupled with the drive system 143. As the vehicle moves, the drive system 143 may rotate the electric motor 198. The electric motor 198 may provide braking forces to the drive system 143 while generating electrical energy. In various implementations, various functions of the ECM 114, the transmission control module 194, and the hybrid control module 196 may be integrated into one or more modules.

Each system that varies an engine parameter may be referred to as an actuator that receives an actuator value. For example only, the throttle actuator module 116 may be referred to as an actuator and the throttle opening area may be referred to as the actuator value. In the example of FIG. 1, the throttle actuator module 116 achieves the throttle opening area by adjusting the angle of the blade of the throttle valve 112. Similarly, the spark actuator module 126 may be referred to as an actuator, while the corresponding actuator value may be the amount of spark advance relative to cylinder TDC. The ECM 114 may control actuator values in order to generate a desired torque from the engine 102.

The ECM 114 may selectively couple and decouple the engine system 100 with the drive system 143 when the gear selector input device 104-4 is in a drive gear of the drive system 143. The ECM 114 may selectively couple and decouple the engine system 100 from the drive system 143 based on input from the accelerator input 104-1 and the vehicle speed. For example only, when a driver releases the accelerator input 104-1 and the vehicle speed is greater than a speed threshold, the ECM 114 may decouple the engine system 100 from the drive system 143. When the driver controls the accelerator input 104-1 to achieve a target vehicle speed or the cruise control input 104-3 is set to the target vehicle speed, the ECM 114 may selectively couple and decouple the engine system 100 with the drive system 143 based on the vehicle speed and the target vehicle speed. The ECM 114 may selectively adjust torque produced by the engine system 100 based on the coupling of the drive system 143 with the engine system 100 and the vehicle speed.

Figure 2:
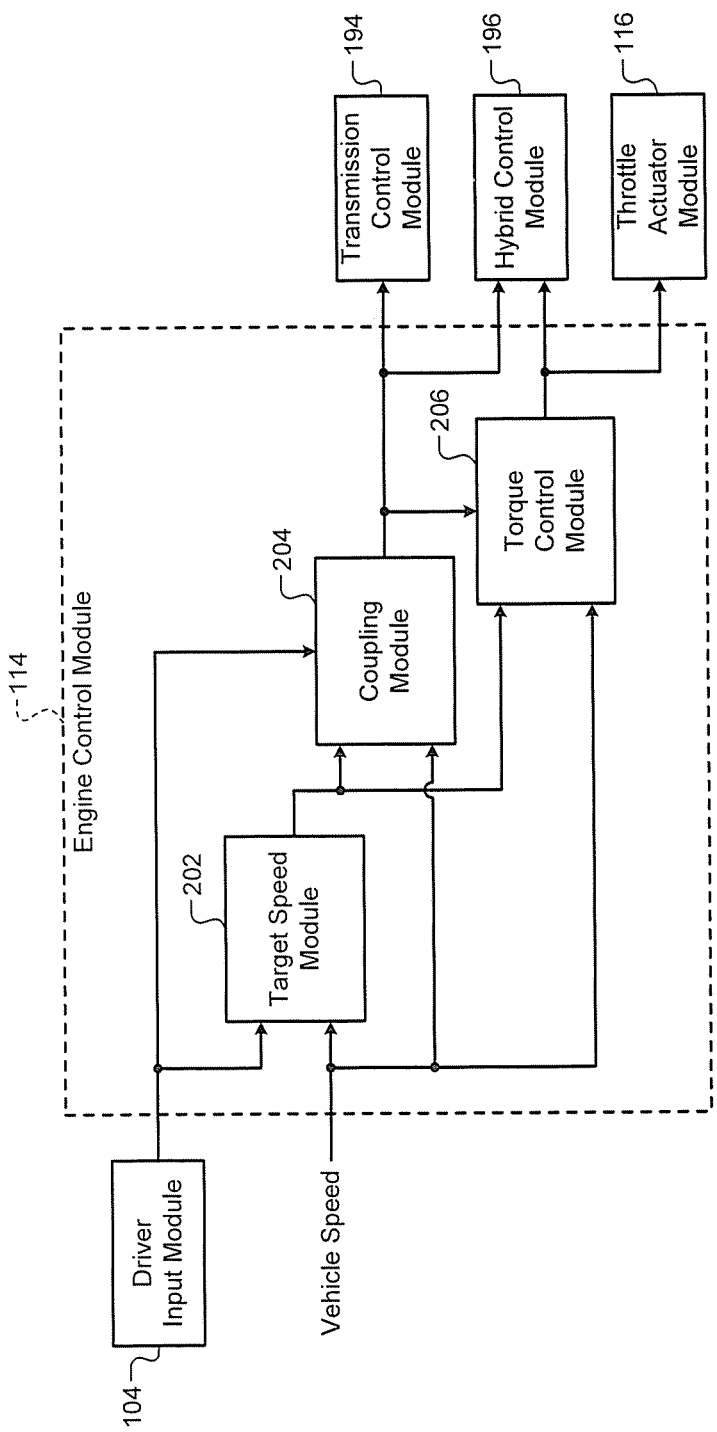
FIG. 2 is a functional block diagram of an exemplary engine control module according to the principles of the present disclosure.

Referring now to FIG. 2, a functional block diagram of an exemplary implementation of the ECM 114 is presented. The ECM 114 may include a target speed module 202, a coupling module 204, and a torque adjustment module 206.

The target speed module 202 may receive the driver input and the vehicle speed. The target speed module 202 may generate a target vehicle speed based on the driver input and/or the vehicle speed. For example only, the target vehicle speed may be set to the vehicle speed when the accelerator input is steady. The accelerator input may be steady when the accelerator position varies less than a predetermined amount over a predetermined time. The target vehicle speed may be set to the vehicle speed when the cruise control input device is turned on. The target speed module 202 may generate a first target speed and a second target speed based on the target vehicle speed. The first target speed may be less than the second target speed. The second target speed may be greater than or equal to the target vehicle speed.

For example only, the first target speed and the second target speed may be based on a speed deviation from the target vehicle speed. The speed deviation may be a calibrateable, predetermined deviation, such as a percentage above or a percentage below the target vehicle speed. The speed deviation may be adjustable based on a driver input signal. For example, the driver may set the speed deviation by adjusting the speed deviation input device 104-5. A target vehicle speed range may be defined as a range of speed greater than or equal to the first target speed and less than or equal to the second target speed.

The coupling module 204 may generate a coupling signal based on the driver input, the target vehicle speed range, and the vehicle speed. The coupling signal may cause the engine system 100 to couple and decouple the drive system 143 based on a state of the driver input and the vehicle speed.

For example only, the driver input may be in a first state when the accelerator position is less than or equal to an accelerator off threshold and the cruise control input device is turned off. The driver input may be in a second state when the accelerator position is greater than the accelerator off position and varies by less than a predetermined amount over a predetermined time. The driver input may be in the second state when the cruise control input device is turned on. The driver input may be in a third state when the brake position is greater than a brake off threshold during a braking period. For each of the states, the gear selector input device 104-4 may be positioned to select a drive gear of the vehicle.

When the driver input is in the first state, the coupling module 204 may decouple the drive system 143 from the engine system 100. The vehicle may coast without drive torque from the engine 102 and/or the electric motor 198. Vehicle speed may decrease at a lower rate than when the engine system 100 is coupled with the drive system 143. Therefore, vehicle energy, in the form of kinetic energy, may be conserved.

For example only, when the engine system 100 is coupled and the driver input is in the first state, engine friction due to engine pumping losses may decrease vehicle speed. The drive system 143 may rotate the electric motor 198 resulting in decreased vehicle speed. Decoupling the engine system 100 reduces vehicle energy losses associated with the engine friction and/or the electric motor 198.

The torque adjustment module 206 may adjust the drive torque of the engine system 100 based on the coupling signal. For example only, when the coupling module 204 decouples the drive system 143 from the engine system 100, the torque adjustment module 206 may decrease the drive torque. Drive torque may be decreased by reducing the throttle value to decrease the drive torque of the engine 102. Drive torque may be decreased by reducing the power to the electric motor 198. Drive torque may be decreased by turning off the electric motor 198. Drive torque may be decreased by reducing engine speed to an idle engine speed that is less than an engine speed corresponding to the vehicle speed.

When the driver input is in the second state, the coupling module 204 may selectively couple the drive system 143 with the engine system 100 based on the vehicle speed. Selectively engaging the drive system 143 may include engaging and disengaging the drive system 143 with the engine system 100. The torque adjustment module 206 may adjust the drive torque of the engine system 100 based on the coupling signal, the vehicle speed, and the target vehicle speed range. The torque adjustment module 206 may adjust the drive torque to maintain the vehicle speed within the target vehicle speed range.

When the vehicle speed is greater than or equal to the first speed threshold and less than or equal to the second speed threshold, the coupling module 204 may decouple the drive system 143 from the engine system 100. The torque adjustment module 206 may decrease drive torque when the coupling module 204 decouples the drive system 143, similar to when the driver input is in the first state. The vehicle may coast without drive torque from the engine 102 and/or the electric motor 198 as discussed above.

When the vehicle speed is less than the first speed threshold, the coupling module 204 may couple the drive system 143 with the engine system 100. The torque adjustment module 206 may increase drive torque by a predetermined amount until the vehicle speed reaches the second speed threshold. Drive torque of the engine 102 may be increased by adjusting the throttle value to increase airflow into the engine 102. The drive torque of the engine 102 may be increased based on an efficiency of the engine 102. For example only, the predetermined amount may be based on a brake specific fuel consumption of the engine 102. Drive torque of the electric motor 198 may be increased by adjusting power to the electric motor 198.

When the vehicle speed is greater than the second speed threshold, the coupling module 204 may couple the drive system 143 with the engine system 100. The torque adjustment module 206 may decrease drive torque until the vehicle speed is less than or equal to the second speed threshold. Drive torque of the engine 102 may be decreased by adjusting the throttle value to decrease airflow into the engine 102. Fueling may be cut and engine friction and pumping losses may produce negative drive torque to decrease the vehicle speed. Drive torque of the electric motor 198 may be decreased by adjusting power to the electric motor 198. The electric motor 198 may be used as a generator to generate electrical energy that decreases vehicle speed.

When the driver input is in the third state, the coupling module 204 may couple the drive system 143 with the engine system 100. The torque adjustment module 206 may adjust the drive torque of the engine system 100 based on the coupling signal. The torque adjustment module 206 may adjust the drive torque to decrease the vehicle speed. For example only, the torque adjustment module 206 may use the engine 102 for braking to decrease the vehicle speed. Engine braking may include cutting fuel to the engine 102 to increase engine friction and pumping losses. The electric motor 198 may be used as a generator to charge the electrical storage device.

Figure 3:
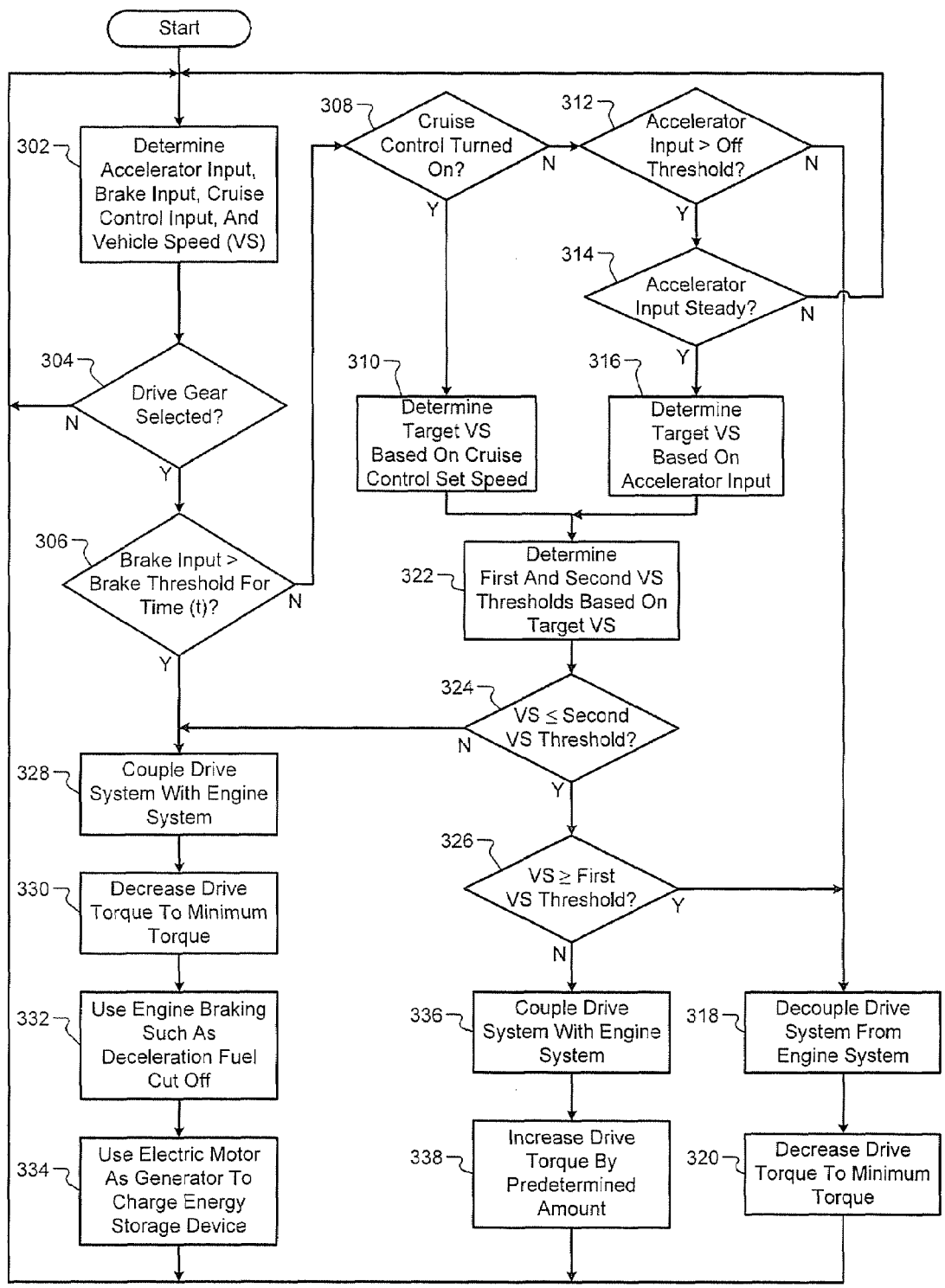
FIG. 3 is a flowchart depicting exemplary steps of a method performed by the engine control module according to the principles of the present disclosure.

Referring now to FIG. 3, a method 300 is shown. Control begins in step 302 when control determines the driver input and vehicle speed. In step 304, control may determine whether a drive gear is selected based on the gear selector input. When the drive gear is not selected, control returns to step 302, otherwise control continues to step 306. In step 306, control determines whether the brake input is greater than a brake off threshold for a predetermined time (t). When the brake is not applied for time (t), control proceeds to step 308.

In step 308, control determines whether the cruise control input device 104-3 is turned on. When cruise control is turned on, control may determine the target vehicle speed based on a cruise control set speed in step 310. Otherwise, control proceeds to step 312. In step 312, control determines whether the position of the accelerator input device 104-1 is greater than the accelerator off threshold. When the accelerator input is greater than the accelerator off threshold, control determines whether the accelerator input is steady in step 314. For example only, control may determine the accelerator input is steady when the accelerator input varies by less than a predetermined amount over a predetermined time. When the accelerator input is steady, control may determine the target vehicle speed based on the accelerator input in step 316.

When the accelerator input is less than or equal to the accelerator off threshold in step 312, control may proceed to step 318. In step 318, control decouples the drive system 143 from the engine system 100. In step 320, control decreases drive torque to a predetermined drive torque. For example only, control may reduce the drive torque of the engine 102 by closing the throttle 112 and decreasing engine speed to an idle engine speed. Control may reduce the drive torque of the electric motor 198 by turning the electric motor 198 off. Control returns to step 302. When the accelerator input is greater than the accelerator off threshold in step 312 and the accelerator input is not steady in step 314, control returns to step 302.

Returning to steps 310 and 316, control proceeds to step 322 after determining the target vehicle speed. In step 322, control determines the first and second vehicle speed thresholds based on the target vehicle speed and proceeds to step 324. When the vehicle speed is less than or equal to the second vehicle speed threshold in step 324, control proceeds to step 326. When the vehicle speed is greater than or equal to the first vehicle speed threshold in step 326, control proceeds to step 318.

When the vehicle speed is greater than the second vehicle speed threshold in step 324, control proceeds to step 328. In step 328, control couples the drive system 143 with the engine system 100. Control decreases the drive torque to a predetermined torque, such as a minimum drive torque of the engine system 100 in step 330. In step 332, control may use engine braking to assist in decreasing the vehicle speed. For example, control may use deceleration fuel cut off (DFCO) or other engine braking techniques to produce negative drive torque. The minimum drive torque may include negative drive torque. In step 334, control may use the electric motor 198 as a generator to charge the electrical storage device 200 and assist in decreasing the vehicle speed.

Returning to step 326, when the vehicle speed is less than the first vehicle speed threshold, control continues to step 336. In step 336, control couples the drive system 143 with the engine system 100. In step 338, control increases the drive torque by a predetermined amount. For example only, control may increase the drive torque until the vehicle speed reaches the second vehicle speed threshold.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system, comprising:
   a target speed module that determines a target speed of a vehicle based on a speed of the vehicle and at least one of an accelerator input and a speed control input; and
   a coupling module that:
      controls coupling of an engine system and a transmission system of the vehicle based on the speed and the target speed when a speed control input device is on;
      when a first position of an accelerator input device is less than a first predetermined value indicative of no driver requested torque and the speed control input device is off, selectively couples and de-couples the engine system and the transmission system based on the vehicle speed;
      couples the engine system with the transmission system when the speed control input device is on, the first position is greater than the first predetermined value, and the first position varies by less than a predetermined amount over a predetermined period; and
      couples the engine system with the transmission system when a second position of a brake input device is greater than a second predetermined value,
   wherein the engine system transfers torque to the transmission system when coupled and does not transfer torque to the transmission system when decoupled.

2. The engine control system of claim 1, further comprising a torque control module that controls torque output by the engine system based on the coupling of the engine system and the drive system, the speed, and the target speed.

3. The engine control system of claim 2, wherein the coupling module decouples the engine system from the drive system and the torque control module reduces the torque output by the engine system to a predetermined torque output when the speed differs by less than a predetermined speed from the target speed.

4. The engine control system of claim 2, wherein the coupling module couples the engine system with the drive system and the torque control module reduces the torque output by the engine system when the speed is greater than the target speed by a predetermined speed.

5. The engine control system of claim 2, wherein the coupling module couples the engine system with the drive system and the torque control module increases the torque output by the engine system when the speed is less than the target speed by a predetermined speed.

6. The engine control system of claim 2, wherein the coupling module decouples the engine system from the drive system and the torque control module reduces the torque output by the engine system to a predetermined torque output when the first position of the accelerator input device is less than the first predetermined value.

7. The engine control system of claim 2, wherein the torque control module controls the torque output of at least one of an internal combustion engine and an electric motor.

8. The engine control system of claim 1, wherein the coupling module controls coupling of the engine system and the drive system by controlling at least one of engagement of a clutch and selection of a neutral gear of an automatic transmission.

9. The engine control system of claim 1, wherein the target speed module determines the target speed when the first position of the accelerator input device is greater than the first predetermined value and varies by less than the predetermined amount during the predetermined period.

10. The engine control system of claim 1, wherein the target speed module determines the target speed when the speed control input device is on.

11. A method, comprising:
    determining a target speed of a vehicle based on a speed of the vehicle and at least one of an accelerator input and a speed control input;
    controlling coupling of an engine system and a transmission system of the vehicle based on the speed and the target speed when a speed control input device is on;
    when a first position of an accelerator input device is less than a first predetermined value indicative of no driver requested torque and the speed control input device is off, selectively coupling and de-coupling the engine system and the transmission system based on the vehicle speed;
    coupling the engine system with the transmission system when the speed control input device is on, the first position is greater than the first predetermined value, and the first position varies by less than a predetermined amount over a predetermined period,
    wherein the engine system transfers torque to the transmission system when coupled and does not transfer torque to the transmission system when decoupled; and
    coupling the engine system with the transmission system when a position of a brake input device is greater than a predetermined value.

12. The method of claim 11, further comprising controlling torque output by the engine system based on the coupling of the engine system and the drive system, the speed, and the target speed.

13. The method of claim 12, further comprising:
    decoupling the engine system from the drive system when the speed differs by less than a predetermined speed from the target speed; and
    reducing the torque output by the engine system to a predetermined torque output.

14. The method of claim 12, further comprising:
    coupling the engine system with the drive system when the speed is greater than the target speed by a predetermined speed; and
    reducing the torque output by the engine system.

15. The method of claim 12, further comprising:
coupling the engine system with the drive system when the speed is less than the target speed by a predetermined speed; and
increasing the torque output by the engine system.

16. The method of claim 12, further comprising:
decoupling the engine system from the drive system when the first position of the accelerator input is less than the first predetermined value; and
reducing the torque output by the engine system to a predetermined torque output.

17. The method of claim 12, further comprising controlling the torque output of at least one of an internal combustion engine and an electric motor.

18. The method of claim 11, further comprising controlling coupling of the engine system and the drive system by controlling at least one of engagement of a clutch and selection of a neutral gear of an automatic transmission.

19. The method of claim 11, further comprising determining the target speed when the first position of the accelerator input is greater than the first predetermined value and varies by less than the predetermined amount during the predetermined period.

20. The method of claim 11, further comprising determining the target speed when the speed control input device is on.

* * * * *